Figure 1:
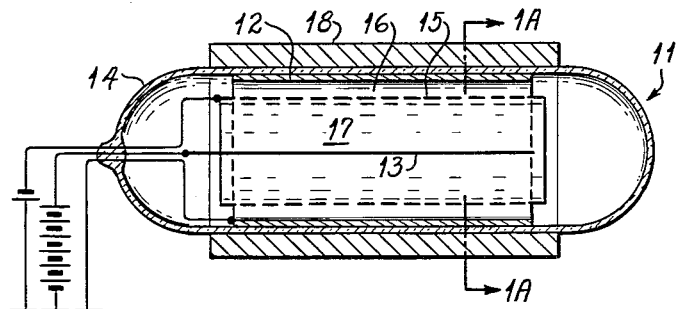

May 15, 1956 J. T. DEWAN 2,745,970
RADIOACTIVITY DETECTOR
Filed Jan. 4, 1952

INVENTOR.
JOHN T. DEWAN
BY
Campbell, Brumbaugh, Free & Graves
HIS ATTORNEYS

United States Patent Office 2,745,970
Patented May 15, 1956

2,745,970

RADIOACTIVITY DETECTOR

John T. Dewan, Houston, Tex., assignor to Schlumberger Well Surveying Corporation, Houston, Tex., a corporation of Delaware Application January 4, 1952, Serial No. 264,934

6 Claims. (Cl. 250—83.6)

The present invention relates to radioactivity detectors and, more particularly, to detectors capable of discriminating between radiations of different types or different energy levels.

It is often desirable to obtain an indication of the amount of relatively high-energy gamma radiation present in radiation comprising both high-energy and low-energy gamma rays, or to obtain an indication of the slow neutrons present in a high flux of low-energy gamma rays. For example, in neutron-gamma ray well logging a source of neutrons is lowered through a bore hole to bombard the formations traversed thereby in order to induce gamma radiation from the formations. It is desired to detect the high-energy capture gamma rays emanating from the formations as an aid to the identification or classification of the formations. However, most neutron sources not only emit neutrons but also low-energy gamma rays which are scattered through the formations and are deflected to the detecting apparatus making it difficult to obtain indications representative solely of the amount of capture gamma radiation present.

It is an object of the present invention to provide novel Geiger counters and ionization chambers for discriminating between radioactive radiations, such as gamma rays or X-rays, of different energy levels or between radioactive radiations of different types.

Another object of the invention is to provide radioactivity detecting apparatus for use in neutron-gamma ray well logging of formations traversed by a bore hole, which apparatus is capable of discriminating between capture and scattered gamma radiation.

These and other objects of the invention are attained by providing an ionization chamber, proportional counter or a Geiger counter having inner and outer ionization regions spaced between an elongated anode and a cathode sheet. The outer region is in a strong longitudinal magnetic field whereby only electrons ejected from the cathode with more than a predetermined velocity can reach the inner ionization region. Only electrons which have velocities above the predetermined minimum cause ionization in the inner region and can be detected. The amount of gamma radiation above a given energy level incident on the cathode of the detector may be determined, since the velocity of electrons emitted by the cathode is dependent upon the energy level of the gamma radiation causing such emission. By coating the inner surface of the cathode with a reactive coating such as a boron compound, for example, the detector may be made to respond to slow neutrons in the presence of a high flux of low-energy gamma radiation.

Figure 1A:
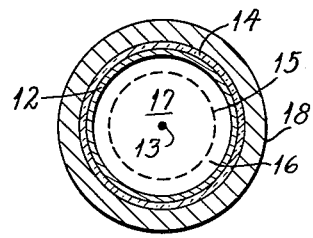
Figure 2:
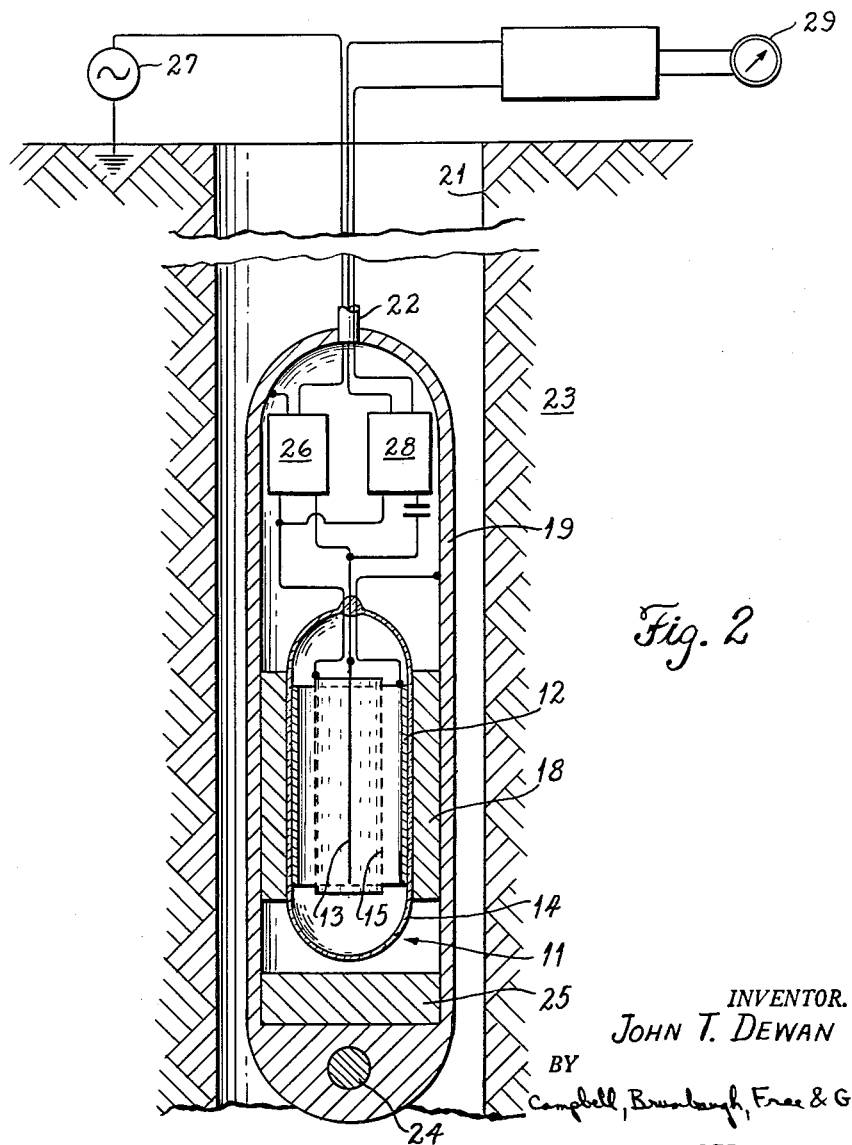

Additional objects and advantages of the invention will be apparent from the following detailed description of a representative embodiment taken in conjunction with the accompanying drawings in which:

Figs. 1 and 1A show schematically a Geiger counter, ionization chamber, or proportional counter constructed in accordance with the invention, for discriminating between gamma or X-radiations of different energy levels; and Fig. 2 shows a radioactivity detector for neutron-gamma ray well logging, constructed in accordance with the inventive principles disclosed in connection with Fig. 1.

Referring now to Figs. 1 and 1A there is shown a radioactivity detector 11. This detector will be described as a Geiger counter, though it is to be understood that it may be operated as an ionization chamber, or proportional counter to which types of devices the principles of the invention apply with equal force. The detector 11 comprises a grounded cylindrical cathode 12, preferably manufactured from a light metal such as aluminum. Coaxial with the cathode 12 is an elongated anode 13 in the form of a wire which is maintained at a relatively high positive potential, for example, 1,000 volts, with respect to the cathode 12. The cathode 12 and the anode 13 are enclosed in an envelope 14 which is filled with a suitable gas at the proper pressure for Geiger action. As is well known, gamma radiation striking the cathode 12 causes electrons to be emitted from the inner surface of the cathode with a velocity dependent upon the energy of the incident gamma radiation. In the absence of the inventive structure described hereinafter such electrons would cause ionization of the gas within the envelope 14 and current pulses representative of the quantity or number of gamma rays, substantially irrespective of their energy levels, would flow between the anode and the cathode.

In accordance with the present invention, however, a cylindrical screen electrode 15, having perforations therein, is placed between the anode and the cylindrical cathode 12. The screen electrode 15 is maintained at a small negative potential, as for example 50 volts, with respect to the cathode 12. The ionization region between the anode 13 and the cathode 12 is thus divided into two volumes, an outer annular region 16 and an inner cylindrical region 17. Placed about the cathode 12 is a magnetic field source 18 such as a permanent magnet or solenoid adapted to establish a magnetic field coaxial with the anode 13. This field is preferably very strong, for example of the order of 1,000 gauss.

In the operation of the detector 11, electrons that have been emitted from the cathode tend to be drawn toward the anode 13 under the influence of the electric field. The magnetic field, however, deflects each electron travelling across the outer ionization region 16 in a direction perpendicular to both the direction of its motion and the component of the magnetic field at right angles to the electronic motion. Each electron describes an arcuate or spiral path having a radius of curvature that is proportional to its velocity and inversely proportional to the component of the magnetic field that acts upon it. High-velocity electrons are only moderately deflected during their passage across the ionization region 16 whereas low-velocity electrons are curved substantially with the result that the latter are returned to the cathode 12. Accordingly, low-velocity electrons do not penetrate to ionization region 17 and therefore do not cause any ionization in the vicinity of the anode 13. Ions produced in the outer ionization region 16 are withdrawn by the screen electrode 15 to which electrode they are attracted by the negative potential. On the other hand, high-velocity electrons reach the inner ionization region 17, causing ionization therein and a consequent current flow between the anode 13 and the screen electrode 15. Any conventional pulse counting circuit may be connected across the anode 13 and the electrode 15 to indicate the current pulses.

The magnetic field will have substantially no effect on the Geiger electron multiplication action in the ionization region 17. Accordingly, it may be seen that by the proper choice of the magnetic field intensity and the spacing between the various electrodes, the detector 11 shown in Figs. 1 and 1A may be employed to discriminate between gamma radiations of any two energy levels.

In Fig. 2 the detector 11 is employed with associated apparatus for neutron-gamma ray well logging. A hollow pressure-resistant housing 19 is lowered through a bore hole 21 by means of a conventional electrical cable 22. The bore hole 21 traverses a plurality of formations 23 concerning which information is desired. It is not essential that the bore hole 21 be uncased (as shown) or contain electrically conductive liquid. The detector 11 is placed within the housing 19. A source 24 of neutrons, which may comprise a mixture of radium and beryllium, for example, is placed in the base of the housing 19. A shield 25, preferably constructed of lead, protects the detector 11 from direct gamma radiation from the neutron source 24.

As the housing 19 is passed through the bore hole 21, the neutron source 24 bombards the formations with neutrons. The formations so bombarded emit capture gamma rays, the energy and relative number of which are a function of the material comprising the formations. It is, therefore, desired to detect such capture gamma rays in order to obtain a characteristic log of the formations 23.

Unfortunately, as discussed above, the source 24 emits not only neutrons but also gamma rays. These gamma rays will be scattered by the formations 23 and by the fluid in the bore hole 21 and some will be deflected to the detector 11. The average energy of gamma rays from radium, for example, is about 0.7 m. e. v. (million electron volts) so that the majority of the scattered gamma rays reaching the detector 11 will have energies of the order of 0.3 m. e. v. On the other hand, capture gamma rays resulting from the bombardment of the formations 23 by neutrons have initial energies on the order of 4 to 6 m. e. v., except for capture in hydrogen where the resultant energy is 2.2 m. e. v.

In accordance with the invention, the detector 11 may be designed to discriminate against the low-energy scattered gamma radiation in favor of the higher-energy capture gamma radiation. The voltages to operate the detector 11 may be obtained from a direct voltage source 26, which in turn may be energized by a suitable alternating voltage source 27 exterior to the bore hole 21. The output signal from the detector 11, appearing between the anode 13 and the screen electrode 15, is amplified by an amplifier 28, and transmitted to a suitable recording device 29 at the surface of the earth.

By selecting the electrode spacing, magnetic field strength and operating potentials of the detector 11 in accordance with the principles disclosed in connection with Fig. 1, the output of the detector may be made a function solely of capture gamma rays, thereby substantially eliminating the effect of the scattered gamma radiation on the recorded log. A detector suitable for this purpose may employ a field strength of 1,000 gauss, an anode to cathode potential of 1,000 volts, and a screen to cathode potential of 50 volts, negative. The screen to cathode spacing may be 1 centimeter, and the anode to cathode spacing may be 3 centimeters. The detector may contain argon gas with a small percentage of quenching gas at a pressure of 0.5 atmosphere.

Alternatively, the detector 11 may be so constructed as to respond only to capture gamma radiation having an energy level greater than 2.2 m. e. v., thereby eliminating the effect of both scattered gamma radiation and capture gamma radiation originating from hydrogen.

In the event that it is desired to detect capture gamma radiation emanating from other than hydrogen, and to detect the capture gamma radiation emanating from hydrogen, as well as the scattered gamma radiation simultaneously, three detectors can be employed. One detector may respond to the total gamma radiation present in the manner well known in the art; the second detector may respond to the total capture gamma radiation present as taught by the invention; and the third detector may respond to the capture gamma radiation emanating from material other than hydrogen. The output of this last detector may be indicated separately as a function of the capture gamma radiation emanating from other than hydrogen. The output from the third detector may also be subtracted mentally or electrically from the output of the second detector responding to the total capture gamma radiation. The difference between the two indications is an indication of the amount of capture gamma radiation emanating from hydrogen. The output of the second detector, which responds to the total capture gamma radiation present, may be subtracted mentally or electrically from the output of the first detector which responds to the total gamma radiation. This combined output gives an indication of the scattered gamma radiation. Other combinations will readily occur to those skilled in the art.

The detectors shown in Figs. 1 and 2 may be made to detect slow neutrons in the presence of a very high flux of low-energy gamma rays. For this purpose the inner surface of the cathode 12 may be coated with a substance, such as a boron compound, that emits alpha particles when bombarded with slow neutrons. The magnetic field does not appreciably affect the paths of these alpha particles because of their mass but substantially prevents the large numbers of electrons, ejected from the cathode 12 by the gamma rays, from ionizing the inner ionization region 17 and producing indications.

A further advantage of detectors constructed in accordance with the present invention is that beta rays are suppressed with the result that the background count is reduced.

It is to be understood that the detector may be constructed in a substantially different way from that illustrated. For example, the anode may comprise a plurality of parallel wires in a common plane sandwiched between parallel planar cathodes and separated therefrom by parallel screen electrodes. Accordingly, the drawing shows an example only, and the invention is limited only by the scope of the appended claims.

I claim:

1. A radioactivity detector comprising an envelope containing an ionizable gas, a cathode and an anode extending in parallel relation within said envelope, a screen electrode between and parallel to the cathode and the anode maintained at a negative potential with respect to the cathode, and means for producing a magnetic field substantially parallel to said electrodes.

2. A radioactivity detector comprising an annular cathode, an anode wire substantially coaxial with said cathode, an annular screen electrode interposed between the anode and cathode, an envelope for immersing said anode, cathode and screen electrode in an ionizable gas, means for producing a substantially axial magnetic field and means for negatively biasing the screen electrode with respect to the cathode.

3. A radioactivity detector comprising an anode wire, a cylindrical annular cathode concentrically surrounding said anode wire, an electron-permeable electrode interposed between said anode wire and said cathode, an envelope enclosing said anode wire, cathode and permeable electrode in an ionizable gas, means for maintaining a positive potential difference between said anode wire and said cathode and a negative potential difference between said electron-permeable electrode and said cathode, and means for establishing a magnetic field substantially coaxial with said anode wire.

4. In apparatus for detecting radioactive radiation by absorbing the incident radiation on a cathode, emitting electrons into an ionizable gas in response to the incident radiation, and indicating the ionization current flowing to an anode under the influence of an electric field, the improvement comprising electron-permeable means for separating the ionizable gas into a first ionization region adjacent the cathode and second ionization region adjacent the anode and means for magnetically deflecting away from the anode electrons emitted from the cathode and travelling toward the anode, whereby electrons having less than a predetermined velocity fail to reach said second region to produce an ionization current flow to the anode.

5. Radioactivity well logging apparatus comprising a radiation source for irradiating with neutrons formations traversed by a bore hole, a cathode predeterminedly spaced from said source for emitting electrons in response to gamma rays received from the formations, an anode associated with said cathode for attracting the electrons across a volume of ionizable gas, an electron-permeable electrode dividing the gas into a first ionization region adjacent said cathode and a second ionization region adjacent said anode, means for magnetically deflecting away from said anode electrons emitted from said cathode and traveling toward said anode whereby only electrons having at least a predetermined velocity reach the second ionization region to produce ionization therein, and means for indicating the current flow between said electron-permeable electrode and said anode.

6. A radioactivity detector comprising a cathode responsive to incident radioactive radiations to emit electrons of varying velocities characteristic of the radioactive radiations, an anode for attracting said electrons spaced from said cathode by a volume of gas ionizable by said electrons, an electron-permeable electrode providing a negative potential barrier spaced between said anode and said cathode, and means for establishing a magnetic field transverse to the anode-cathode trajectories of said electrons, whereby only electrons having a velocity greater than a predetermined velocity may produce ionization beyond said barrier.

References Cited in the file of this patent
UNITED STATES PATENTS

| | | |
|---|---|---|
| 2,039,100 | McArthur | Apr. 28, 1936 |
| 2,252,645 | Rougvie | Aug. 12, 1941 |
| 2,470,224 | Scherbatskoy | May 17, 1949 |
| 2,499,489 | Goldstein et al. | Mar. 7, 1950 |
| 2,520,603 | Linder | Aug. 29, 1950 |

OTHER REFERENCES

"The Determination of Gamma Ray Energies with Magnetic Lens Spectrometer," by E. N. Jensen, AECD 2399, December 3, 1948, published by U. S. Atomic Energy Commission, pages 1–70, 25083.6A.